Sept. 19, 1933.  L. J. POWELL  1,927,373
TIRE CHAIN
Filed March 30, 1933

Inventor
Lawrence J. Powell

By Clarence A. O'Brien
Attorney

Patented Sept. 19, 1933

1,927,373

UNITED STATES PATENT OFFICE 1,927,373

TIRE CHAIN

Lawrence J. Powell, Carrollton, Ill.

Application March 30, 1933. Serial No. 663,617

2 Claims. (Cl. 152—14)

The present invention relates to new and useful improvements in tire chains for use on vehicles for preventing skidding and has for its primary object to provide, in a manner as hereinafter set forth, a device of this character embodying a novel construction, combination and arrangement of parts through the medium of which breakage from wear or strain at the points where the cross-chains connect with the side chains will be materially reduced or substantially eliminated, thus prolonging the life or period of usefulness of the tire chain considerably.

Other objects of the invention are to provide a tire chain of the aforementioned character which will be simple in construction, reliable in use, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1:
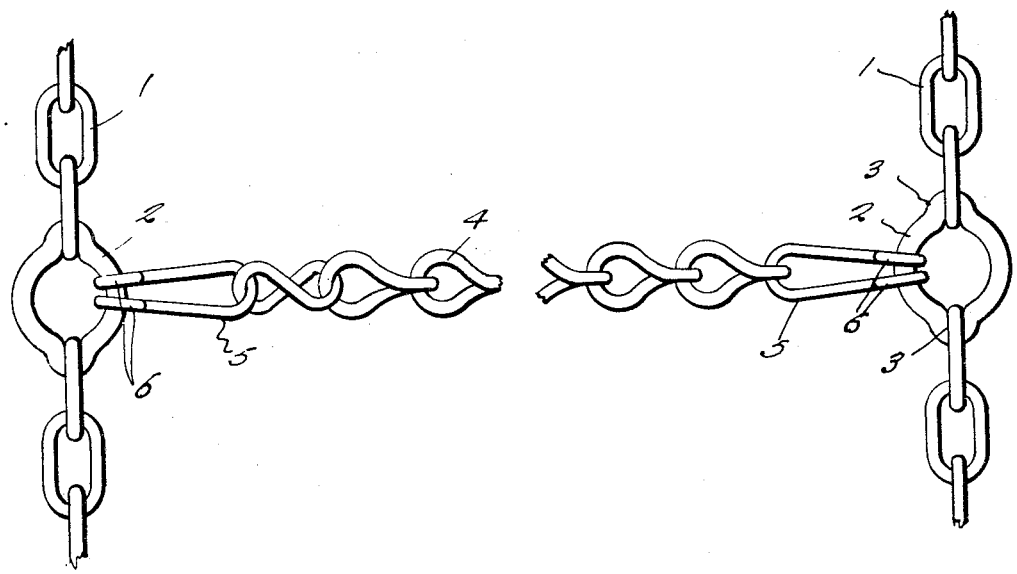
Figure 1 is a plan view of a portion of a tire chain constructed in accordance with the present invention.

Referring now to the drawing in detail, it will be seen that the reference numeral 1 designates portions of a pair of side chains in which are interposed comparatively large, heavy links 2. The links 2 are substantially circular and include diametrically opposite extensions 3 for the reception of the adjacent links of the side chains 1, said extensions 3 being substantially U-shaped.

The reference numeral 4 designates a cross-chain which is coupled, at its ends, to the links 2 of the side chains 1 by hooked connectors 5.

Figure 2:
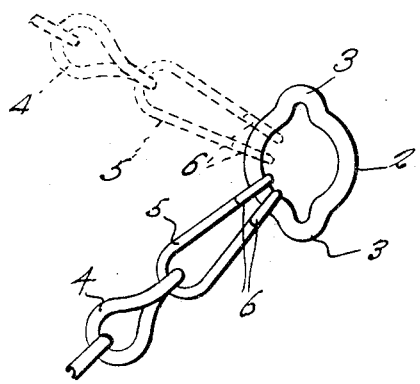
Figure 2 is a detail view, showing positions assumed by the cross chains which are connected to the links of the side chains constituting the essential elements of the present invention.
Figure 3:
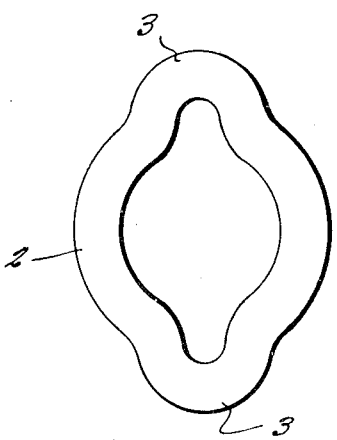
Figure 3 is a detail view in elevation of one of the links constituting the essential feature of the invention.

It will thus be seen that the cross chain 4 may assume either of the positions illustrated in Figure 2 of the drawing, according to the direction of rotation of the vehicle wheel, and the strain will be equally distributed between the hook portions 6 of the connectors 5 at all times by reason of the substantially circular shape of the links 2. Further, the adjacent links of the side chains 1, being seated or engaged in the substantially U-shaped extensions 3, are disposed substantially flush with, or outwardly of, the inner periphery of the links 2 thereby permitting the connectors 5 to shift on the links 2 without interference. Still further, the engagement of the adjacent links of the side chains 1 in the extensions 3 will prevent rotation of the links 2 when the chain is in use and in this manner eliminate wear to which said links 2 would otherwise be subjected. The hook portions 6 of the connectors 5 are sufficiently large to permit the links 2 to be manually rotated in a manner to bring the other sides of said links into engagement with said connectors when one side of the links 2 becomes worn. This, together with the comparatively large size of the links 2, assures said links 2 lasting at least the life of the rest of the chain.

It is believed that the many advantages of a tire chain constructed in accordance with the present invention will be readily understood, particularly by those skilled in the art to which it pertains, and although the preferred embodiment of the invention is as illustrated and described, it is to be understood that changes in the details of construction and in the combination and arrangement of parts may be resorted to which will fall within the scope of the invention as claimed.

What is claimed is:—

1. A tire chain comprising side chains, comparatively large, substantially circular links interposed in the side chains and including outwardly projecting substantially U-shaped, diametrically opposite extensions, the adjacent links of the side chains being engaged in the extensions to prevent shifting of the adjacent links of the side chains on said substantially circular links and to hold said substantially circular links against rotation when the chain is in use, and cross-chains shiftably connected, at their ends, to the substantially circular links.

2. A tire chain comprising side chains, comparatively large, heavy, substantially circular links interposed in the side chains, said links including outwardly projecting diametrically opposite, substantially U-shaped extensions for the reception of the adjacent links of the side chains so as to prevent shifting of the adjacent links of the side chains on said substantially circular links and to hold said substantially circular links against rotation when the chain is in use, cross chains, and substantially U-shaped connectors coupling the cross chains, at their ends, to the substantially circular links, said connectors including hook portions slidably engaged with the substantially circular links, the hook portions of said connectors and the adjacent links of said side chains being of a size to provide for the passage of said extensions and the rotation of said substantially circular links when the chain is not in use.

LAWRENCE J. POWELL.